United States Patent
Ikenoya et al.

[11] Patent Number: 5,722,539
[45] Date of Patent: Mar. 3, 1998

[54] PACKAGING CONTAINER

[75] Inventors: Tadakatsu Ikenoya; Kazuya Ono, both of Tokyo, Japan

[73] Assignee: Tetra Laval Holdings & Finance, S.A., Switzerland

[21] Appl. No.: 696,620

[22] Filed: Aug. 14, 1996

Related U.S. Application Data

[62] Division of Ser. No. 442,107, May 16, 1995.

[30] Foreign Application Priority Data

May 23, 1994 [JP] Japan .................................. 6-108669

[51] Int. Cl.[6] .................................................. B65D 3/22
[52] U.S. Cl. ...................... 206/484; 206/524.2; 220/680
[58] Field of Search .......................... 206/484, 524.1, 206/524.2–524.3, 524.4, 524.9; 220/678, 680–692

[56] References Cited

U.S. PATENT DOCUMENTS

| | | | |
|---|---|---|---|
| 3,157,338 | 11/1964 | Hollister | 229/45 |
| 4,034,132 | 7/1977 | Manue | 428/36 |
| 4,613,536 | 9/1986 | Makilaakso | 428/403 |
| 4,720,039 | 1/1988 | Nishiguchi | 229/48 |
| 4,916,031 | 4/1990 | Kitamura et al. | 428/626 |
| 5,598,927 | 2/1997 | Ikenoya et al. | 206/484 |

FOREIGN PATENT DOCUMENTS 2124997   6/1983   United Kingdom.

OTHER PUBLICATIONS

Patent Abstracts of Japan, vol. 13, No. 577, 20 Dec. 1989.
Patent Abstracts of Japan, vol. 14, No. 29, 19 Jan. 1990.

*Primary Examiner*—Jacob K. Ackun
*Attorney, Agent, or Firm*—Lorusso & Loud

[57] ABSTRACT

A packaging container having an enhanced sealing performance includes a packaging material, an outside strip and a strip tape. The opposite side edges of the packaging material are overlapped with each other so that the outermost layer and the innermost layer of the packaging material face each other. The outside strip is interposed between the outermost layer and the innermost layer and is fused and joined with these layers so that a longitudinal sealing portion is formed. The outside strip has an outside layer and an inside layer. The strip tape is placed on the inner surface of the packaging container along the sealing portion, and is joined thereto by heat fusion. The innermost layer of the packaging material and the outside layer of the outside strip are made of a non-olefin flavor-retaining resin, and the outermost layer of the packaging material and the inside layer of the outside strip are made of a polyolefin resin. Since portions to be joined at the longitudinal sealing portion are both polyolefin, an enhanced sealing performance can be obtained.

4 Claims, 4 Drawing Sheets

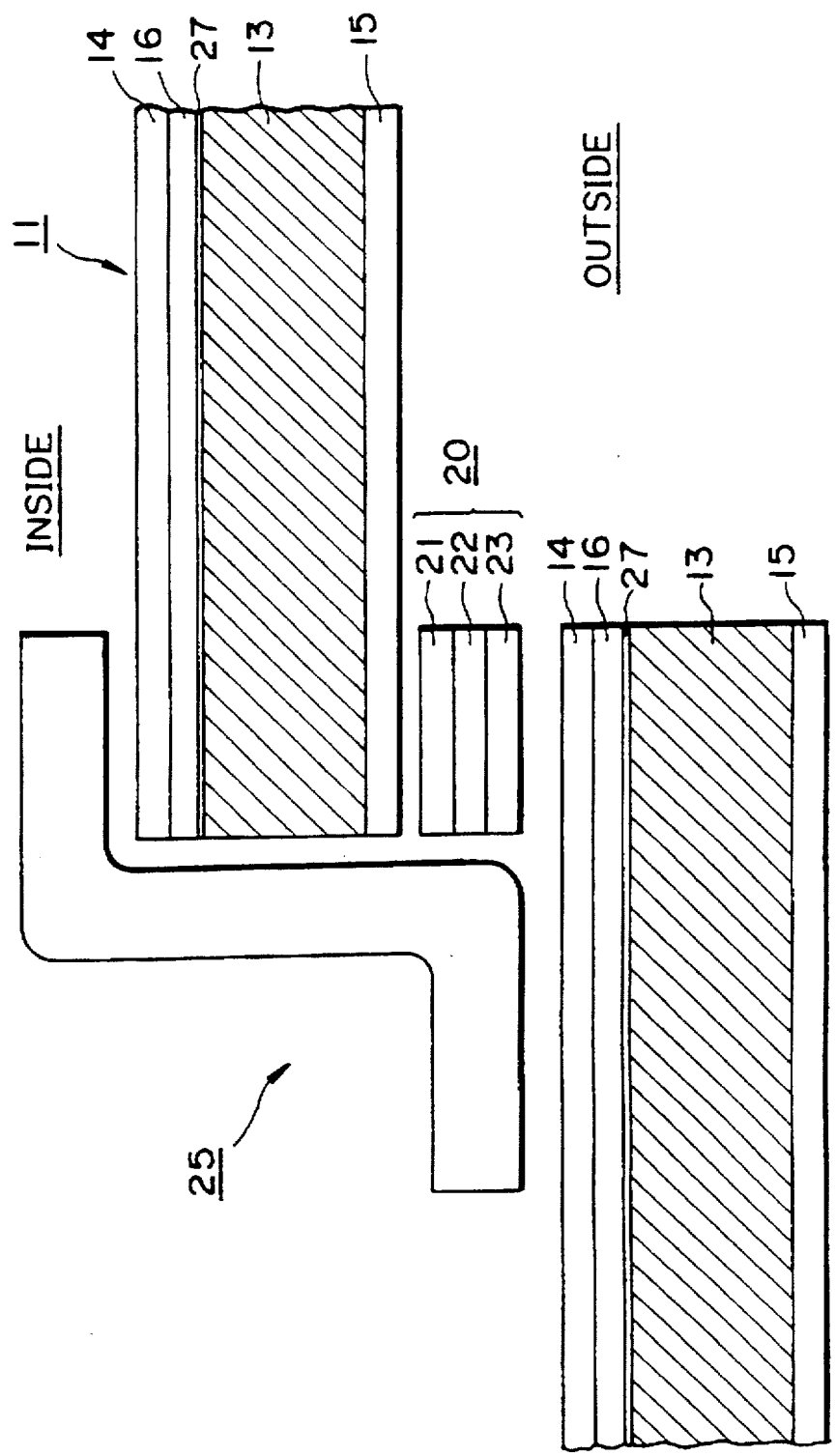

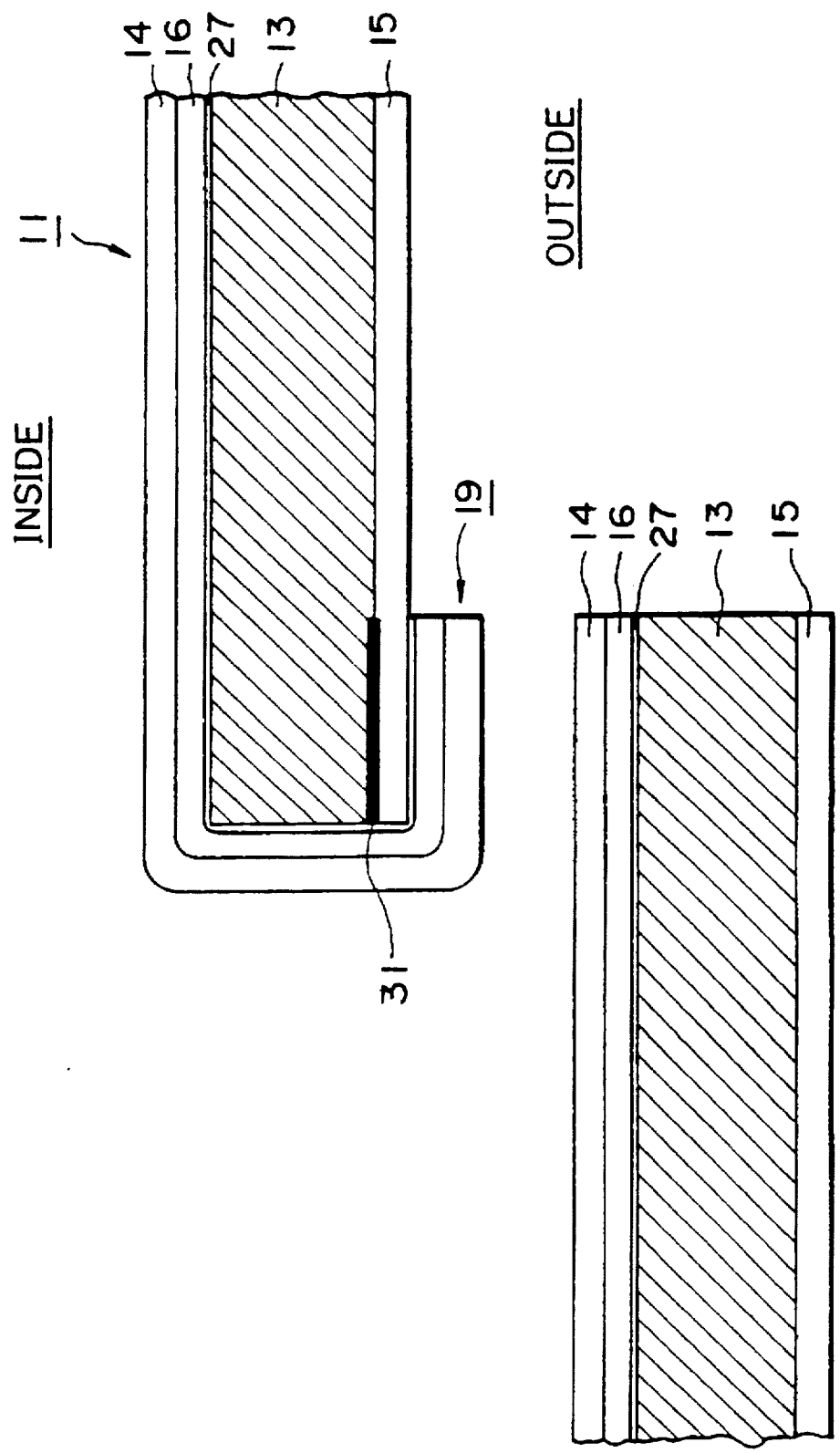

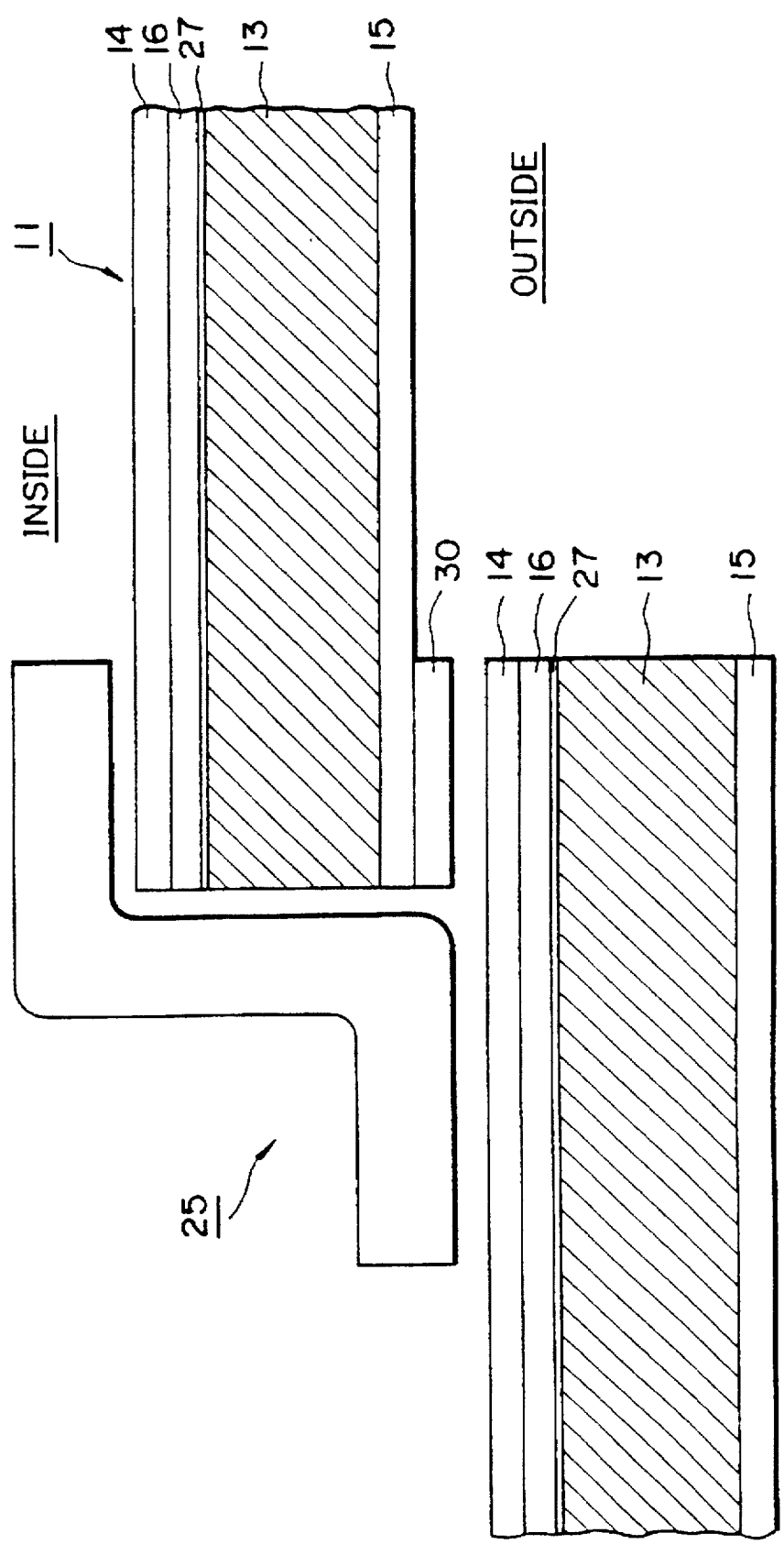

PACKAGING CONTAINER

This application is a division of U.S. Ser. No. 08/442,107 filed May 16, 1995.

BACKGROUND OF THE INVENTION

1. Field of the Invention

The present invention relates to a packaging container.

2. Description of the Related Art

Conventionally, packaging containers used for holding liquid foods such as soft drinks and milk have been manufactured in a manner in which a web-like packaging material is formed into a brick-like shape, for example.

FIG. 1 is a sectional view of a conventional packaging material.

As shown in this drawing, a packaging material 11 is composed of a paper substrate 13, a layer 14 which is the innermost layer when the packaging material 11 is shaped into a package container (hereinafter simply referred to as the "innermost layer"), a layer 15 which is the outermost layer when the packaging material 11 is shaped into a package container (hereinafter simply referred to as the "outermost layer"), a gas barrier layer 16 formed between the paper substrate 13 and the innermost layer 14, and an adhesive layer 27. The paper substrate 13 is made of paperboard or a similar material, and the gas barrier layer 16 is bonded thereto by the adhesive layer 27.

The opposite side edges of the packaging material 11 are overlapped with each other and then joined together by heat fusion in the longitudinal direction to obtain a tubular packaging material. The tubular packaging material is then continuously transferred downward while a liquid food is supplied into it from its top. Then, the tubular material is pressed from both sides thereof and is sealed laterally at predetermined intervals so as to obtain pillow shaped containers, which are then formed into a brick-like shape.

A strip tape 25 is adhered to the sealed portion longitudinally extending along the inner surface of each packaging container (hereinafter referred to as "longitudinal sealing portion") to prevent air from entering the packaging container from a side edge of the packaging material 11 and to prevent liquid food from permeating the paper substrate 13.

Packaging containers, the packaging material 11 of which has the innermost layer 14 made of a polyolefin resin, do not have sufficient ability to maintain the flavors of foods. This is because liquid foods contained in the containers contact the polyolefin resin, which adsorbs flavoring ingredients of the liquid foods over time.

In order to increase the flavor-retaining ability of each container, the polyolefin resin layer may be coated with a non-olefin flavor-retaining resin which serves as the innermost layer 14. In this case, the strip tape 25 is made of a non-polyolefin resin which can be easily joined to the above-described flavoring-retaining resin by heat fusion. The strip tape 25 is adhered to the longitudinal sealing portion using heat and pressure.

When the innermost layer 14 of the web-like package material is made of a flavor-retaining resin, the resin is joined to a polyolefin resin forming the outermost layer 15 when the overlapped side edges of the packaging material 11 are fused and joined in the longitudinal direction. However, since the flavor-retaining resin and the polyolefin resin are difficult to join with each other, only a poor seal can be obtained.

This problem can be solved by joining the flavor-retaining resin and the polyolefin resin by fusion after activating the sealing portion of the surface of the flavor-retaining resin by a corona discharge treatment, an ozone treatment, or a flame treatment, or by joining the flavor-retaining resin and the polyolefin resin by fusion at a high temperature.

However, a sufficient seal cannot be obtained even when the flavor-retaining resin is subjected to corona discharge treatment, ozone treatment or flame treatment.

When the flavor-retaining resin and the polyolefin resin are fused at a high temperature to join them together, the manufacturing costs increase due to the necessity of an apparatus for high-temperature fusion.

It is possible to join the flavor-retaining resin forming the innermost layer 14 and the polyolefin resin forming the outermost layer 15 with an adhesive made of an ethylene—vinyl acetate copolymer (EVA), polyethylene chloride, or the like. In this case, however, steps for applying the adhesive to the packaging material 11 and drying it are additionally required, increasing the complexity and costs in the production process and making the work troublesome.

SUMMARY OF THE INVENTION

An object of the present invention is to solve the above-described problems of conventional packaging containers and to provide a packaging container which has an enhanced sealing performance and which reduces production costs.

A packaging container according to one aspect of the present invention includes a packaging material, an outside strip, and a strip tape. The opposite side edges of the package material are overlapped with each other so that the outermost layer and the innermost layer of the package material face each other. The outside strip is interposed between the outermost layer and the innermost layer along a longitudinal sealing portion, and is joined by heat fusion with the outermost layer and the innermost layer. The outside strip has an outside layer and an inside layer. The strip tape is placed on the inner surface of the packaging container along the longitudinal sealing portion, and is joined thereto by heat fusion.

The innermost layer of the packaging material and the outside layer of the outside strip are made of resins which have compatibility with each other while the outermost layer of the packaging material and the inside layer of the outside strip are made of resins which have compatibility with each other.

With this structure, resins which are compatible with each other are melted and joined to each other to form a longitudinal sealing portion, thereby providing an enhanced sealing performance.

A packaging container according to another aspect of the present invention includes a packaging material having a paper substrate, an intermediate layer, an outermost layer, and an innermost layer. The opposite side edges of the packaging material are overlapped with each other so that the outermost layer and the innermost layer of the packaging material face each other.

The intermediate layer and the innermost layer of the packaging material are projected from the side edges of the paper substrate and the outermost layer to form a bending portion which extends along the sealing portion. The bending portion is inserted between the outermost layer and the innermost layer of the packaging material by folding the bending portion and is joined to those layers by heat fusion.

The outermost layer and the intermediate layer of the packaging material are made of resins which are compatible with each other.

With this structure, resins which are compatible with each other are melted and joined to each other to form a longitudinal sealing portion, thereby providing an enhanced heat sealing performance.

The side edge of the packaging material located inside the packaging container is covered with the bending portion. Accordingly, liquid food is prevented from permeating the paper substrate through the edge of the packaging material, and so the packaging container has an enhanced durability. In addition, the operation for adhering a strip tape to the inner surface of the packaging container along the longitudinal sealing portion becomes unnecessary.

A packaging container according to still another aspect of the present invention includes a packaging material, a hot melt layer, and a strip tape. The opposite side edges of the packaging material are overlapped with each other so that the outermost layer and the innermost layer of the packaging material face each other. The hot melt layer is provided between the outermost layer and the innermost layer along a longitudinal sealing portion. The strip tape is placed on the inner surface of the packaging container along the sealing portion, and is joined thereto by heat fusion.

With this structure, an enhanced sealing performance can be obtained due to the existence of the hot melt layer between the innermost layer and the outermost layer.

In a packaging container according to still another aspect of the present invention, the innermost layer of the packaging material is preferably a non-olefin flavor-retaining resin.

In this case, since liquid food in the packaging container contacts the flavor-retaining resin, the flavor ingredients of the liquid food are not absorbed thereby, resulting in an enhanced flavor retainability.

Preferably, a heat absorbing layer is formed on the outside of the paper substrate.

In this case, the outer surface of the paper substrate is covered by the heat absorbing layer along the longitudinal sealing portion. Accordingly, when infrared rays are irradiated to the longitudinal sealing portion, the heat absorbing layer is locally heated to a high temperature due to the radiant heat, so that the intermediate layer and the outermost layer can be easily fused and joined to each other without causing color changes in the remaining printed surface.

BRIEF DESCRIPTION OF THE DRAWINGS

The structures and features of packaging containers according to the present invention will become clear by referring to the accompanying drawings, in which:

FIG. 2 is a sectional view of a packaging material according to a first embodiment of the present invention;

FIG. 3 is a sectional view of a packaging material according to a second embodiment of the present invention; and FIG. 4 is a sectional view of a packaging material according to a third embodiment of the present invention.

DESCRIPTION OF PREFERRED EMBODIMENTS

Figure 1:
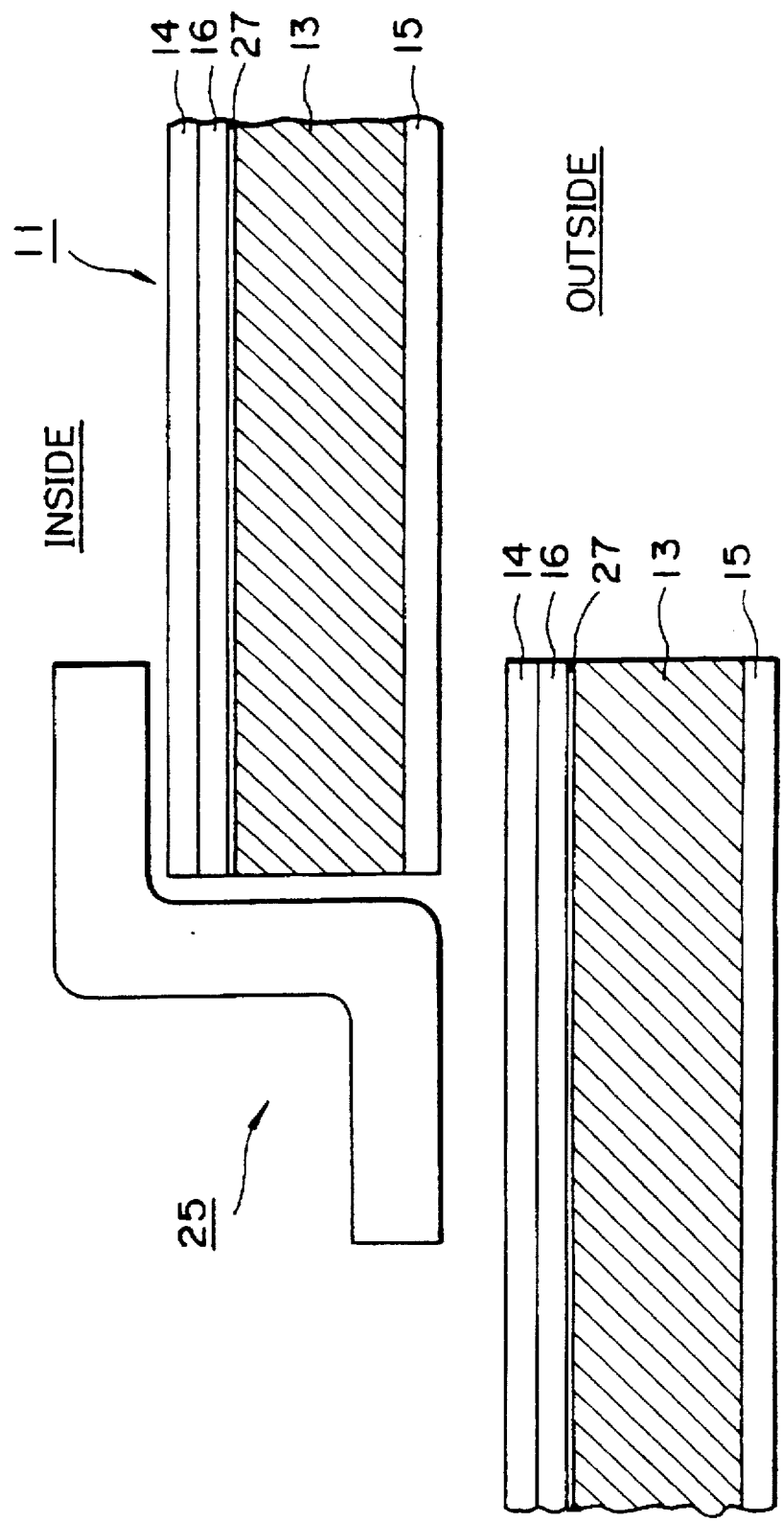
FIG. 1 is a sectional view of a conventional packaging material.

Embodiments of the present invention will now be described in detail with reference to the accompanying drawings.

FIG. 2 is a sectional view of a packaging material according to a first embodiment of the present invention.

As shown in FIG. 2, a packaging material 11 is composed of a paper substrate 13, an innermost layer 14, an outermost layer 15, a gas barrier layer 16 formed between the paper substrate 13 and the innermost layer 14, and an adhesive layer 27. The paper substrate 13 is made of paperboard or the like, and the gas barrier layer 16 is adhered to the paper substrate 13 by the adhesive layer 27. An ethylene—acrylic acid copolymer or the like is used to form the adhesive layer 27. An aluminum foil is used for the gas barrier layer 16.

The innermost layer 14 is formed of a flavor-retaining resin which is coated on the surface of the gas barrier layer 16 which will be located inside the gas barrier layer 16 when the packaging material 11 is formed in a packaging container. The outermost layer 15 is formed of a polyolefin resin which is coated on the surface of the paper substrate 13 which will be located outside the paper substrate 13 when the packaging material 11 is formed in a packaging container. An adhesive layer may be formed between the innermost layer 14 and the gas barrier layer 16, if necessary.

Examples of the flavor-retaining resin include non-clef in resins such as polyester resins, polyamide resins, polyvinylidene chloride resins, ethylene—vinyl alcohol copolymers, polyvinyl chloride resins, epoxy resins, polyurethane resins, polyacrylate resins, polyacrylonitrile resins, and polycarbonate resins. A molten flavor-retaining resin is extruded as a film from an unillustrated extruder, and is then superposed on the inner surface of the gas barrier layer 16. A small amount of an additive such as nitrocellulose may be optionally added in the molten flavor-retaining resin. In the present embodiment, a modified polyester is used for the flavor-retaining resin.

Since the liquid food comes into contact with the flavor-retaining resin, the flavor ingredients of the liquid food are not absorbed thereby. As a result, an enhanced flavor retainability can be obtained.

Examples of the polyolefin resin include polyethylene, polypropylene, low-density polyethylene, and linear low-density polyethylene. In the present embodiment, polyethylene is used for the polyolefin resin.

A packaging container for carrying liquid food can be obtained by forming the web-like packaging material 11 into, for example, a brick-like shape. In detail, the opposite side edges of the packaging material 11 are overlapped with each other and are joined by heat fusion in the longitudinal direction to obtain a tubular packaging material. The obtained tubular material is continuously transferred downward while a liquid food is supplied into it from the top. Then, the tubular material is pressed from both sides thereof and is sealed laterally at predetermined intervals so as to obtain pillow shaped containers, which are then formed into a brick-like shape.

Since the innermost layer 14 is made of a flavor-retaining resin, it is difficult to join the innermost layer 14 to the outermost layer 15 by heat fusion, in order to join the opposite side edges of the packaging material 11 in the longitudinal direction. Also, it becomes difficult to join opposite surfaces of the innermost layer 14 by heat fusion.

To overcome these problems, the packaging container according to the present embodiment employs an outside strip 20 which is disposed between the innermost layer 14 and the outermost layer 15 along the longitudinal sealing portion to prevent the outermost layer 15 from coming into direct contact with the innermost layer 14. Therefore, the opposite side edges of the packaging material 11 are joined to each other via the outside strip 20.

To this end, the outside strip 20 is adhered to the packaging material 11 along the longitudinal sealing portion before the packaging material is sterilized using hydrogen peroxide. In this case, infrared rays are irradiated or hot air is jetted to the longitudinal sealing portion of the outermost layer 15.

The outside strip 20 is composed of an inside resin layer 21 which is contacted with the outermost layer 15 and is made of a resin compatible with the outermost layer 15, an outside resin layer 23 which is contacted with the innermost layer 14 and is made of a resin compatible with the innermost layer 14, and an adhesive layer 22 for bonding the inside resin layer 21 and the outside resin layer 23.

The inside resin layer 21 is made of a polyolefin resin. Examples of the polyolefin resin include polyethylene, polypropylene, low-density polyethylene, and linear low-density polyethylene. In the present embodiment, low-density polyethylene is used.

The outside resin layer 23 is made of a non-olefin resin. Examples of the non-olefin resin include polyester resins, polyamide resins, polyvinylidene chloride resins, ethylene—vinyl alcohol copolymers, polyvinyl chloride resins, epoxy resins, polyurethane resins, polyacrylate resins, polyacrylonitrile resins, and polycarbonate resins. In the present embodiments a modified polyester is used.

As described above, the sealing performance can be improved by interposing the outside strip 20 between the innermost layer 14 and the outermost layer 15 along the longitudinal sealing portion.

Since the packaging material 11 has a web-like shape, the paper substrate 13 is exposed to the liquid food in the packaging container at a side edge. Therefore, a strip tape 25 is adhered to the inner surface of the packaging container along the longitudinal sealing portion to prevent the paper substrate 13 from being exposed to the liquid food.

The strip tape 25 is composed of a layer of a modified polyester, an adhesive layer, a layer of a stretched polyester, an adhesive layer, and a layer of a modified polyester which are superposed in this order from the side facing the innermost layer 14. The layer of a stretched polyester is formed to reinforce the strip tape 25.

Next, the results of tests which were performed on packaging containers manufactured in the above-described manner will be described.

In a pressure test, the packaging containers endured a pressure of 50 kgf. In a test for detecting pinholes, no packaging container having a pinhole existed in 1,000 packaging containers examined. Subsequently, a drop test was performed by dropping 50 packaging containers from a height of 270 cm. No packaging container caused leakage of liquid food.

Also, a vibration test was performed by applying a vibration of 12 Hz for 30 minutes to each packaging container while applying a load of 0.5 g thereto. The generation of a pinhole or leakage of liquid food was not found in 891 tested packaging containers. The top portion of one packaging container was deformed.

Next, a second embodiment of the present invention will be described.

FIG. 3 is a sectional view of a packaging material according to the second embodiment of the present invention.

As shown in FIG. 3, a packaging material 11 is composed of a paper substrate 13 as a base layer, an innermost layer 14, an outermost layer 15, a gas barrier layer 16 formed between the paper substrate 13 and the innermost layer 14, and an adhesive layer 27 as an intermediate layer. The paper substrate 13 is made of paperboard or the like, and the gas barrier layer 16 is adhered to the paper substrate 13 by the adhesive layer 27. A resin compatible with the outermost layer 15 is used to form the adhesive layer 27. An aluminum foil is used for the gas barrier layer 16.

The innermost layer 14 is formed of a flavor-retaining resin which is coated on the inner surface of the gas barrier layer 16. The outermost layer 15 is formed of a polyolefin resin which is coated on the outer surface of the paper substrate 13.

Examples of the flavor-retaining resin include non-olefin resins such as polyester resins, polyamide resins, polyvinylidene chloride resins, ethylene—vinyl alcohol copolymers, polyvinyl chloride resins, epoxy resins, polyurethane resins, polyacrylate resins, polyacrylonitrile resins, and polycarbonate resins. A molten flavor-retaining resin is extruded as a film from an unillustrated extruder, and is then superposed on the inner surface of the gas barrier layer 16. A small amount of an additive such as nitrocellulose may be optionally added in the molten flavor-retaining resin. In the present embodiment, polyester is used as the flavor-retaining resin.

Since the liquid food comes into contact with the flavor-retaining resin, the flavor ingredients of the liquid food are not absorbed thereby. As a result, an enhanced flavor retainability can be obtained.

Examples of the polyolefin resin include polyethylene, polypropylene, low-density polyethylene, and linear low-density polyethylene. In the present embodiment, polyethylene is used for the polyolefin resin. Therefore, polyethylene is also used for the adhesive layer 27.

A packaging container for carrying liquid food can be obtained by forming the web-like packaging material 11 into, for example, a brick-like shape. In detail, the opposite side edges of the packaging material 11 are overlapped with each other and are joined by heat fusion in the longitudinal direction to obtain a tubular packaging material. The obtained tubular material is continuously transferred downward while a liquid food is supplied into it from the top. Then, the tubular material is pressed from both sides thereof and is sealed laterally predetermined intervals to obtain pillow shaped containers, which are then formed into a brick-like shape.

Since the innermost layer 14 is made of a flavor-retaining resin, it is difficult to join the innermost layer 14 to the outermost layer 15 by heat fusion in order to join the opposite side edges of the packaging material 11 in the longitudinal direction. Also, it becomes difficult to fuse and join facing surfaces of the innermost layer 14.

To overcome these problems, the packaging container according to the present embodiment employs a structure in which a bending portion 19 integratedly extended from the packaging material 11 is disposed between the innermost layer 14 and the outermost layer 15 at the longitudinal sealing portion to prevent the outermost layer 15 from coming into direct contact with the innermost layer 14. The opposite side edges of the packaging material 11 are joined via the bending portion 19.

The bending portion 19 is formed by extending the innermost layer 14, the gas barrier layer 16 and the adhesive layer 27 from one side edge of the packaging material 11 such that they project from the end surfaces of the paper substrate 13 and the outermost layer 15 by a predetermined amount. Therefore, the bending portion 19 has a laminated structure formed by the innermost layer 14, the gas barrier layer 16 and the adhesive layer 27.

Before the packaging material 11 is sterilized with hydrogen peroxide, the bending portion 19 is bent outward and folded, and the adhesive layer 27 and the outermost layer 15 are brought into contact with each other and fused for joining together. In this case, black ink 31 serving as a heat absorbing layer is applied to the outer surface of the paper substrate 13 along the longitudinal sealing portion. Accordingly, when infrared rays are irradiated to the longitudinal sealing portion, the black ink 31 is locally heated to a high temperature due to the radiant heat, so that the adhesive layer 27 and the outermost layer 15 can be easily fused and joined to each other without causing color changes in the remaining printed surface.

Subsequently, both side edges of the packaging material 11 are fused and joined to each other in the longitudinal direction. Since the bending portion 19 has been folded outward and the adhesive layer 27 has been joined to the outermost layer 15 at the bending portion 19, one lateral end portion of the innermost layer 14 comes into contact with the other lateral end portion of the innermost layer 14, so that an enhanced sealing performance can be obtained.

As described above, the sealing performance can be improved by interposing the bending portion 19 of the packaging container between the innermost layer 14 and the outermost layer 15 along the longitudinal sealing portion.

Since the packaging material 11 has a web-like shape, the paper substrate 13 is exposed to the liquid food in the packaging container at a side edge. In the present embodiments the paper substrate 13 is prevented from being exposed to the liquid food by covering the exposed side edge with the bending portion 19. Accordingly, it is not necessary to adhere a strip tape to the inner surface of the packaging container along the longitudinal sealing portion. As a result, it is possible to simplify the production process and to reduce costs.

Next, a third embodiment of the present invention will be described.

FIG. 4 is a sectional view of a packaging material according to the third embodiment of the present invention.

As shown in FIG. 4, a packaging material 11 is composed of a paper substrate 13, an innermost layer 14, an outermost layer 15, a gas barrier layer 16 formed between the paper substrate 13 and the innermost layer 14 and an adhesive layer 27. The paper substrate 13 is made of paperboard or the like, and the gas barrier layer 16 is adhered to the paper substrate 13 by the adhesive layer 27. An ethylene—acrylic acid copolymer or the like is used for forming the adhesive layer 27. An aluminum foil is used for the gas barrier layer 16.

The innermost layer 14 is formed of a flavor-retaining resin which is coated on the inner surface of the gas barrier layer 16. The outermost layer 15 is formed of a polyolefin resin which is coated on the outer surface of the paper substrate 13.

In the present embodiment, a hot melt layer 30 is disposed between the innermost layer 14 and the outermost layer 15 along the longitudinal sealing portion. Therefore, the both side edges of the packaging material 11 are joined to each other via the hot melt layer 30.

The present invention is not limited to the above-described embodiments, and various modifications and variations can be made based on the spirit of the present invention. Therefore, these modifications and variations should not be construed to be excluded from the scope of the present invention.

What is claimed is:

1. A packaging container comprising:

a packaging material including a paper substrate, an intermediate layer, an outermost layer, and an innermost layer and having opposite side edges which overlap each other such that said outermost layer and said innermost layer of said packaging material face each other; and a bending portion formed by projecting said intermediate layer and said innermost layer from one side edge of said packaging material such that said intermediate and innermost layers project from the edges of said paper substrate and said outermost layer, said bending portion being inserted between said outermost layer and said innermost layer of said packaging material by folding said bending portion and being joined by heat fusion with said outermost layer and said innermost layer, said innermost layer being made of a flavor-retaining resin which retains flavors of food, said outermost layer and said intermediate layer of said packaging material being made of resins which are compatible with each other, and said outermost layer and said innermost layer of said packaging material being made of resins which are incompatible with each other.

2. A packaging container according to claim 1, in which said innermost layer of said packaging material is made of a non-olefin flavor-retaining resin.

3. A packaging container according to claim 1, in which said outermost layer of said packaging material is made of a polyolefin resin.

4. A packaging container according to claim 1 in which a heat absorbing layer is formed on the outer surface of said paper substrate.

* * * * *

UNITED STATES PATENT AND TRADEMARK OFFICE
CERTIFICATE OF CORRECTION

PATENT NO. : 5,722,539
DATED : March 3, 1998
INVENTOR(S) : IKENOYA et al

It is certified that error appears in the above-indentified patent and that said Letters Patent is hereby corrected as shown below:

Col. 4, line 20, "non-clef in" should read --non-olefin--.

Col. 6, line 41, after "laterally" insert --at--.

Signed and Sealed this

Seventeenth Day of November, 1998

Attest:

BRUCE LEHMAN

Attesting Officer

*Commissioner of Patents and Trademarks*